| United States Patent [19] | [11] Patent Number: 4,825,928 |
| Woodrow | [45] Date of Patent: May 2, 1989 |

[54] METERED SHADE

[76] Inventor: Arthur F. Woodrow, 6501 E. Grant Rd., Tucson, Ariz. 85715

[21] Appl. No.: 116,689

[22] Filed: Nov. 4, 1987

[51] Int. Cl.$^4$ .............................................. E05F 15/20
[52] U.S. Cl. .......................................... 160/1; 160/10
[58] Field of Search ............................. 160/1, 2, 7, 10; 52/174; 414/231, 232, 252, 227, 228

[56] References Cited

U.S. PATENT DOCUMENTS

| 1,719,055 | 7/1929 | Herzer . | |
| 2,751,977 | 6/1956 | Pinkerton . | |
| 2,869,562 | 1/1959 | Francis | 160/370.2 X |
| 2,878,998 | 3/1959 | Spencer | 414/228 X |
| 3,004,301 | 10/1961 | Francis | 160/370.2 X |
| 3,060,519 | 10/1962 | Francis | 160/370.2 X |
| 3,463,174 | 8/1969 | Heller . | |
| 3,481,073 | 12/1969 | Yoshida et al. | 160/2 X |
| 3,872,911 | 3/1975 | Janes | 160/1 |
| 4,128,307 | 12/1978 | Badertscher et al. | 160/167 X |

Primary Examiner—Robert W. Gibson, Jr.
Assistant Examiner—David M. Purol
Attorney, Agent, or Firm—Mark E. Ogram

[57] ABSTRACT

A metered shade which provides shelter/shade for a specified amount of time before the shade is removed. Through the use of a meter which is activated by either currency of a "credit card" arrangement, the shade is provided for a chosen length of time. The mechanism is activated so that shade is provided for an area such as an automobile parking space. A further enhancement of the invention deactivates the shading process when either the time has lapsed or the vehicle vacates the spot.

18 Claims, 2 Drawing Sheets

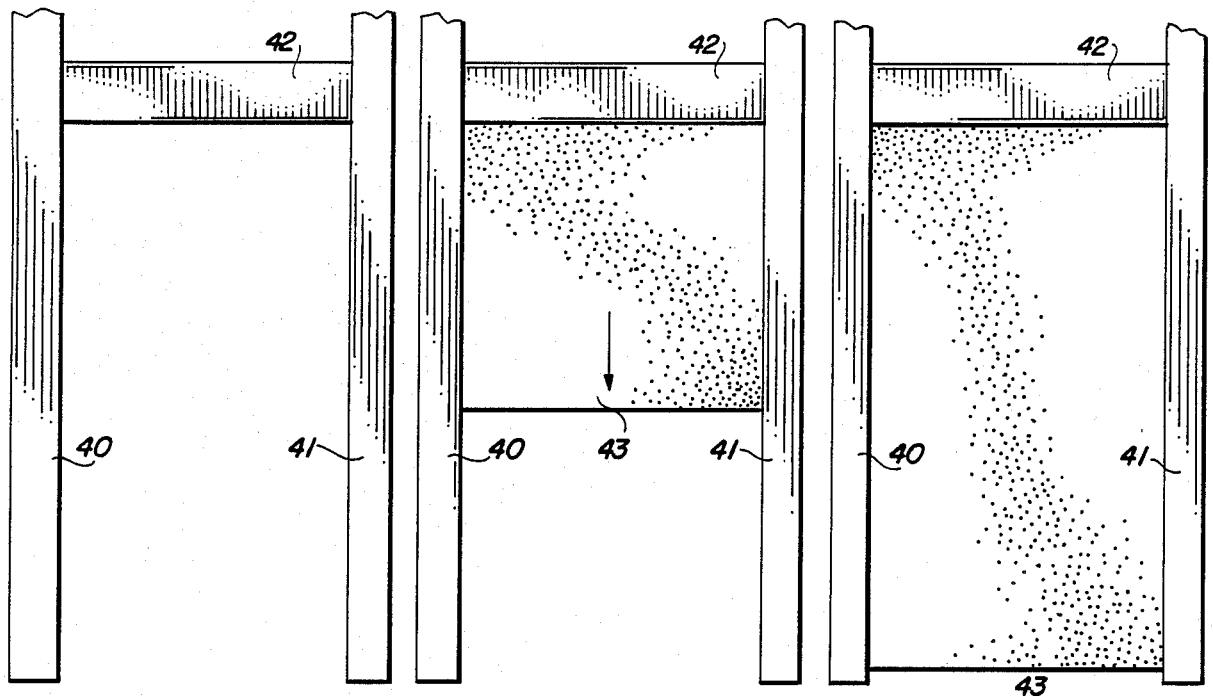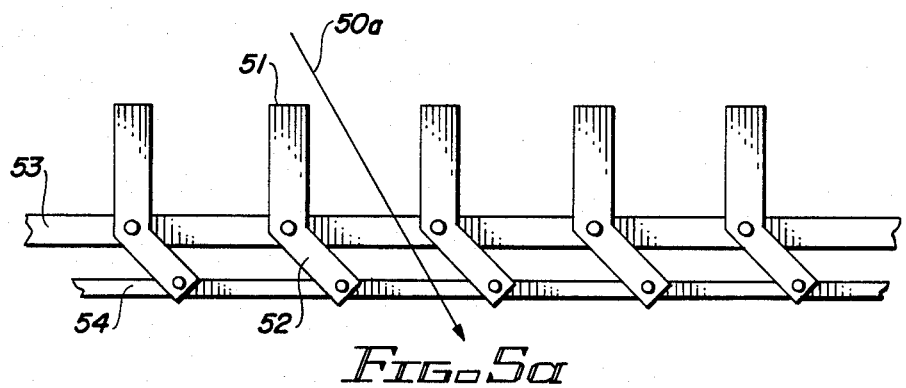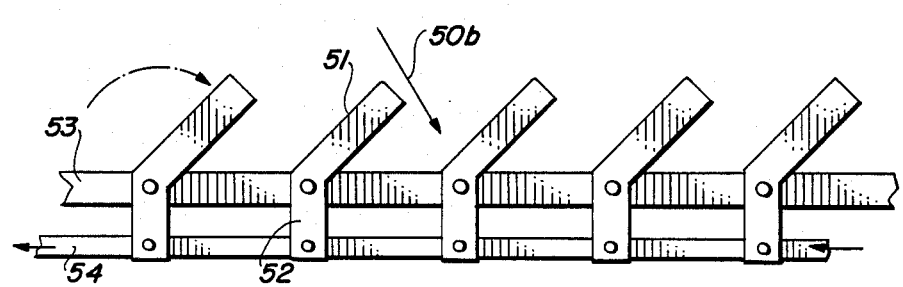

METERED SHADE

BACKGROUND

This invention relates generally to metered parking spaces and more particularly to spaces which provide additional services.

In many parts of the country, particularly in the Southwest, protection from the elements is very important. Should the vehicle be exposed to direct sunshine, the interior of the vehicle can heat to temperatures of well over 130 degrees fahrenheit. This temperature can be obtained in only a few minutes.

Once so heated, driving the vehicle becomes extremely uncomfortable. Even with the aid of refrigeration, it takes up to half an hour to bring the temperature of the vehicle down to an acceptable level.

The intense temperature can kill plants, ruin groceries, kill or incapacitate pets, people and children, cause volatile liquids to explode, damage the upholstery of the vehicle, crack the leather, vinyl or wood, and fade materials. Metal parts within the automobile such as seat belt buckles and steering wheels, become so hot that they cannot be touched by the operator.

Additionally the high temperature can have catastrophic affects upon items left within the vehicle and even the vehicle itself. Magnetic tapes and photographic film which are left within the vehicle can be destroyed by the intense temperature. As vehicles start to use more electronics, very high and sustained temperatures can jeopardize their integrity.

The problem of overheating of the vehicle and its protection has existed almost from the day of the first motor-vehicle. As far back as 1927 U.S. Pat. No. 1,719,055 entitled "Combination Bumper, Container, Tent, and Car Cover" was issued to Herzer on a shade which was transported with the vehicle. Similar other United States patents were issued on this approach to the problem such as U.S. Pat. No. 2,751,977 entitled "One Man Automobile Cover" issued to Pinkerton on June 26, 1956 and U.S. Pat. No. 3,463,174 entitled "Portable Cover Structure" issued to Heller on Aug. 26, 1969.

In each of these instances, the operator must manually drape or form a frame of fabric material over the vehicle. Because of their nature, these approaches are susceptible to the elements such as wind and rain. Draping of the material so that it contacts the vehicle, exposes the paint of the vehicle to wear as even a minor breeze moves the fabric. The devices are also very restraining to the vehicle making it difficult to obtain access to the vehicle without removing the shelter itself.

In another attempt to solve the heating and exposure problem, many businesses have constructed permanent shades for use by their employees or customers. Although this does provide protection, the quick shopper who only needs protection for a short period of less than an hour, is not usually provided any protection. As noted earlier, even this short time can substantially increase the temperature within the vehicle.

The main reason for the lapse in providing protection, is the cost associated with the construction of a permanent structure. Most businesses cannot afford to provide this service for their customers.

Another solution which has been used is the placement of cardboard screens on the inside of the vehicle behind the front windshield. Although this does provide some protection, the cardboard screen is merely trapping the hot air inside the vehicle. The ultraviolet rays still enter the vehicle's front windshield (no protection is provided for windows other than the windshield) and heats the vehicle in the same manner.

Window tinting has also been done. In this approach, a film which is resistant to ultraviolet rays is applied to the windows of the vehicle. Although this does provide some relief, the interior of the vehicle is darkened for normal driving. To many users, this is not desirable.

As is readily apparent, there doesn't exist any acceptable solutions for this problem.

SUMMARY OF THE INVENTION

In the present invention, the shading of the targeted space, or parking space, is controlled according to time. The mechanism provides shade for the space only when the user has paid for the service. In this manner, the cost of the shade's construction is borne by the user and not the establishment where the shade is located.

In the preferred embodiment of the invention, a meter is placed in the locale of the parking space. The user deposits the correct amount of change, or alternatively charges it to a credit card, and the mechanism unfurls a shade over the parking space. This shade is left unfurled until either the time has elapsed based upon the amount paid, or the vehicle vacates the parking space.

Identifying when a vehicle vacates the parking space is accomplished by any type of presence sensor known to those of ordinary skill in the art. This includes magnetic sensors which are embedded in the parking space itself, electronic beams crisscrossing the parking space, or a sonic sensor.

By identifying when a vehicle has vacated the spot, and then removing the shade from the parking spot, the device has performed its primary duty, providing shade for the paying customer; additionally, the removal of the shade does not encourage a non-paying customer to take advantage of whatever shade time is available. To obtain the shade, the customer must pay.

Many different embodiments exist for the creation of the shade itself. Included are louvered slats which are lowered when activated, a sweep arm which extends over the parking space, and others which are obvious to those of ordinary skill in the art.

The preferred embodiment is a frame which supports a fabric material which, when activated, is extended, via the frame, to cover the targeted area. The fabric material is either solid and translucent, or a webbing arrangement. The webbing arrangement has the added ability that it will not catch and contain rain and thereby become overburden by the precipitation. Should a solid fabric be utilized, additional supports and an angling of the shade to shed the precipitation is ncessary.

The metered aspect of the invention is important since it transfers the cost of the construction to the user of the shade. Although in the preferred embodiment of the invention, the meter is positioned at the site of the shade, another embodiment of the invention places the meter at a central location such as a recreational vehicle park's central office. The recreational vehicle owner, when renting a parking space specifies if he desires shade for his vehicle. If so, the park's operator activates the meter for the appropriate space. In this example, the meter may operate for days or even months and is not deactivated should the vehicle leave the space.

Although in the preferred embodiment of the invention the meter is capable of accepting change, those of ordinary skill in the art recognize that other type of meters are available such as paper money activated, credit card activated, and the like.

Although the present discussion has used the vehicle parking space as its illustration, those of ordinary skill in the art readily recognize that the invention's capability extends to any area where shade is provided for a targeted area based upon the use of a meter. This would include a shade provided for a picnic area, stadium boats, airplanes, etc.

The invention, together with its various embodiments will be more fully described by the following drawings and their accompanying descriptions.

DRAWINGS IN BRIEF

FIGS. 4a, 4b, and 4c are top views of an embodiment of the invention during three phases of operation.

FIGS. 5a and 5b are side views of an embodiment of the shading arrangement using louvers for the shading mechanism.

DRAWINGS IN DETAIL

Figure 1:
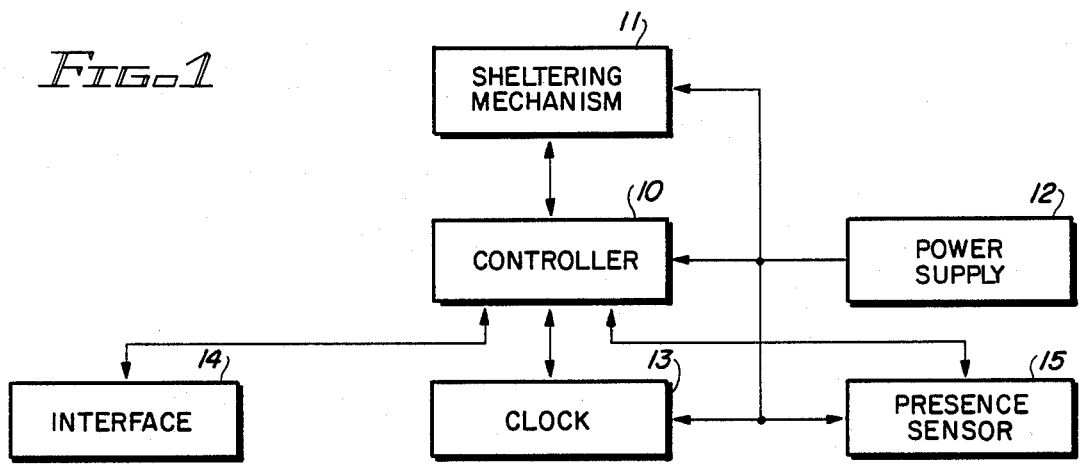
FIG. 1 is a block diagram of the operation of the preferred embodiment.

In FIG. 1, controller 10 acts as the central control unit for this preferred embodiment. Interface 14 provides information to controller 10 as to the user's desires. This includes information as to the amount of money either deposited or charged to a credit card. Data from clock 13 assists controller 10 in determining when the allotted time has elapsed.

Shade for the parking space or targeted area is provided by the sheltering mechanism 11 as directed by the controller 10. A feed back system from sheltering mechanism 11 to controller 10 permits the controller to know the state of the sheltering mechanism 11 (i.e. shade provided, shade not provided, shade being extended, shade being withdrawn).

In the preferred embodiment of the invention, a short time is permitted to pass before data from the presence sensor 15 is consulted. This passing of time permits the vehicle to be parked in the space. Thereafter, controller 10 monitors the clock 13 and the presence sensor 15 to determine if the sheltering mechanism 11 should be instructed to withdraw the shade. As noted earlier, the shade is withdrawn when either the time allotment has elapsed or the vehicle is removed from the parking space or targeted area.

Power supply 12 provides power for all of the different functions of this preferred embodiment. In this embodiment power supply 12 is connected to the public utilities but other embodiments are obvious to those of ordinary skill in the art such as photo-voltaic cells with battery storage.

FIG. 1 illustrates a fully self-contained unit which provides shade for an operator's use. Because of its structure, only users with a need for shade will operate the device and obtain its benefits; should a part not want to obtain the shade, he is not forced to pay for it.

Figure 2:
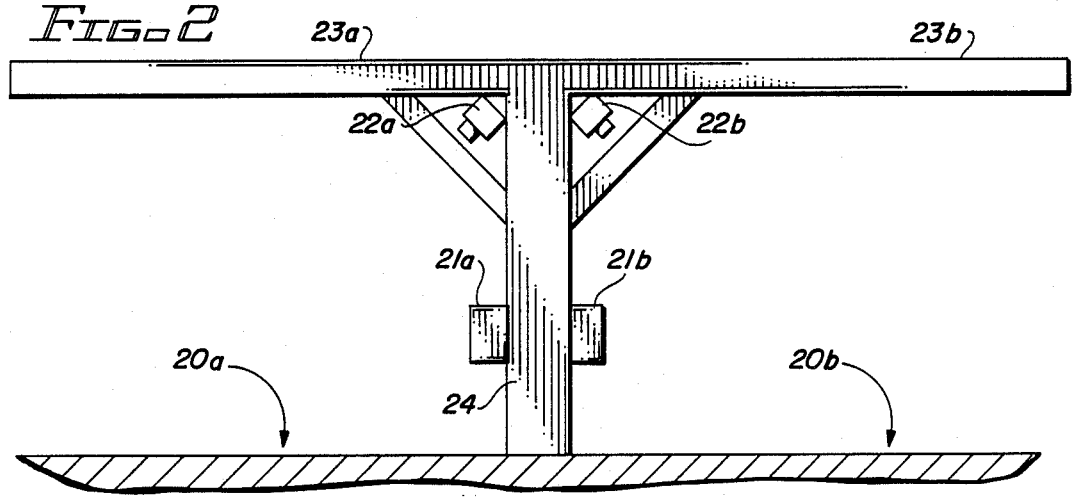
FIG. 2 is a cross sectional view of an embodiment of the invention.

FIG. 2 is a cross sectional view of an embodiment of the invention. In this embodiment of the invention, there are two targeted areas, 20a and 20b. Frame 24 has arms 23a and 23b extending over the targeted areas 20a and 20b respectively.

Meter 21a contains the controller which manipulates the shade (not shown) which is extended over the targeted area 20a via arm 23a. Sensor 22a communicates the existence of a vehicle in targeted area 20a to the controller within meter 21a. Meter 21b, sensor 22b, and arm 23b operate in a similar manner.

Whereas arms 23a and 23b are substantially parallel to the level of the ground of the targeted areas 20a and 20b respectively, if a solid fabric material is used for the shading substance, the preferred mode is to have arms 23a and 23b slope away from frame 24 so that precipitation is directed away and does not collect on the solid fabric material.

Figure 3A:
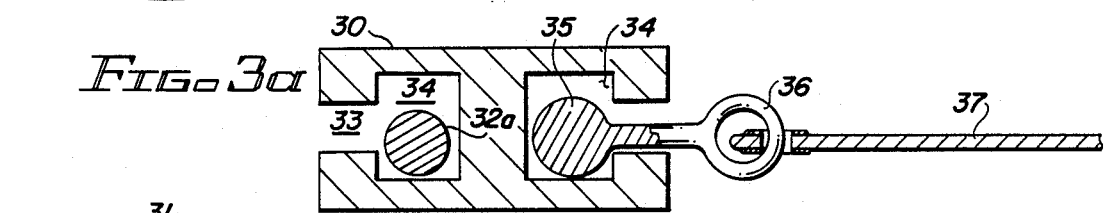
FIGS. 3a and 3b illustrate the support frame for the preferred embodiment of the invention.
Figure 3B:
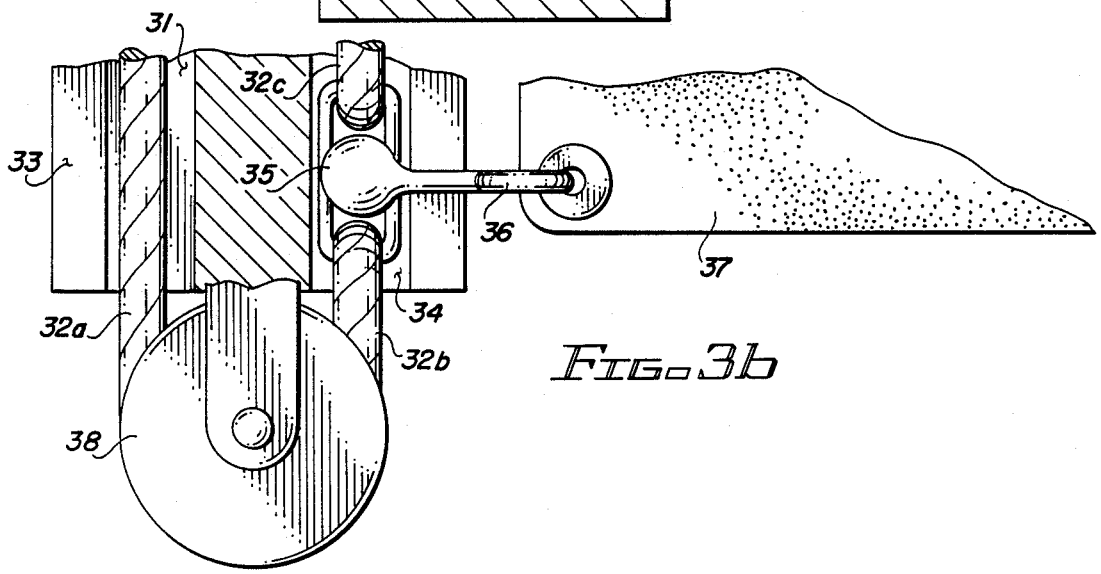

FIGS. 3a and 3b further illustrate the arms and their workings first illustrated in FIG. 2.

FIG. 3a is a cut-away view of the preferred embodiment of the frame which supports the shading material. Frame 30 has two grooves 31 and 34. Within groove 31 lies cable 32a. Opening 33 permits ready inspection of cable 32a and allows easy installation of the cable.

Groove 34 lies on the shading side of frame 30. Holder 35 nests in groove 34. Holder 35 also has retaining ring 36 which attaches to the fabric material 37.

Referring to FIG. 3b, cable 32a passes around pulley 38. The cable 32b within groove 34 attaches to holder 35. Cable 32c attaches to holder 35 and also to the next holder (not shown) within groove 34. As cable 32a is withdrawn, holder 35 is moved along groove 34. In similar manner, as the cable 32c is withdrawn, so is the shade 37.

FIGS. 4a, 4b, and 4c are sequential top views of an embodiment of the invention.

In FIG. 4a, the shading fabric is fully contained within its housing 42. Frame arms 40 and 41 are positioned to support the shading fabric 43 as it is unfurled in FIG. 4b. Once fully extended, the shading fabric 43 extends substantially to the ends of frame arms 40 and 41.

FIGS. 5a and 5b are side views of an embodiment of the invention which utilizes movable slats to create the shade for the targeted area.

In FIG. 5a, sunlight 50a is at an angle such that slats 51 do not block it from passing through to the targeted area. Each slat 51 is pinned to slide member 53 and slide member 54.

In FIG. 5b, slide member 54 is moved relative to slide member 53. Because of the angle of footing 52, slats 51 are rotated so that the sunlight 50b does not pass through to the targeted area.

In this embodiment of the invention, slats 51 are designed not to come in contact with each other. This permits precipitation and dirt to fall through and not cause undue weight to the structure.

It is clear from the foregoing that the present invention provides a mechanism to address the problems of the past by creating a metered shade.

What is claimed is:

1. A sheltering mechanism comprising:
   A. a frame;
   B. meter means for establishing a maximum time lapse; and,
   C. shelter means being controlled by said meter means and supported by said frame wherein when said shelter means is activated by said meter means, shelter is provided for a targeted area.

2. The sheltering mechanism according to claim 1 wherein said meter means includes an elapsed clock means and wherein said meter means deactivates said shelter means when said elapsed clock means equals said maximum time lapse.

3. The sheltering mechanism according to claim 2 further comprising means for sensing the existence of an object within the targeted area and wherein said meter means deactivates said shelter when the targeted area is vacated.

4. The sheltering mechanism according to claim 3 wherein said meter means includes means for receipt of an accounting material and means for counting the amount of said accounting material, and wherein said maximum time lapse is established by the amount within said means for counting.

5. The sheltering mechanism according to claim 4 wherein said means for counting includes a card reader.

6. The sheltering mechanism according to claim 4 wherein said means for counting including a money counting mechanism.

7. The sheltering mechanism according to claim 4 wherein said shelter means further includes a fabric material which is supported by said frame during activation and further including a storage bin for receipt and storage of said fabric material during deactivation.

8. The sheltering mechanism according to claim 7 wherein said fabric material is translucent.

9. The sheltering mechanism according to claim 7 wherein said fabric material is a netting material.

10. The sheltering mechanism according to claim 4 wherein said means for sensing the existence of an object includes a magnetic sensor embedded within the targeted area.

11. The sheltering mechanism according to claim 4 wherein said means for sensing the existence of an object includes a plurality of electron beams with a corresponding number of electron beam sensors and wherein signals from the electron beam sensors indicate the existence of an object within the targeted area.

12. A metered shade mechanism comprising:
  A. shading means having,
    1. a frame, and,
    2. means for selectivly applying shade to a targeted area;
  B. means for sensing if an object is occupying said targeted area
  and generating a presence signal therefrom;
  C. control means having,
    1. means for receipt of indicia of accounting,
    2. clock means for computing elapsed time from receipt of said indicia of accounting, and
    3. means for activating said means for applying shade upon the receipt of said indicia of accounting and for withdrawing said shade via said means for selectively applying shade based upon said presence signal and said elapsed time.

13. The metered shade mechanism according to claim 12 wherein said means for receipt of indicia of accounting includes a card reader.

14. The metered shade mechanism according to claim 12 wherein said means for receipt of indicia of accounting includes means for counting deposited money.

15. The metered shade mechanism according to claim 12 wherein said means for sensing includes a magnetic sensing device.

16. The metered shade mechanism according to claim 12 wherein said means for sensing includes a plurality of light beams with matching light sensors and wherein the signals from said light sensors indicate the existence of an object within said targeted area.

17. A method of providing shade to a targeted area comprising the steps of:
  A. receiving an indicia of accounting indicating the length of time desired by an operator;
  B. providing shade to the targeted area for for the time desired.

18. The method of providing shade to a targeted area according to claim 17 further comprising the steps of:
  A. determining if an object is within the targeted area; and,
  B. maintaining the shade for so long as an object remains within the targeted area and the length of time has not elapsed.

* * * * *